(12) United States Patent
Telford et al.

(10) Patent No.: US 7,007,896 B2
(45) Date of Patent: Mar. 7, 2006

(54) SHOCK AND VIBRATION ISOLATION SYSTEM

(75) Inventors: Kenneth N. Telford, Huntington Beach, CA (US); Chris M. Paavola, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 10/713,760

(22) Filed: Nov. 13, 2003

(65) Prior Publication Data

US 2005/0116088 A1    Jun. 2, 2005

(51) Int. Cl.
*B64G 1/00* (2006.01)

(52) U.S. Cl. .................................. 244/158 R
(58) Field of Classification Search ............ 244/158 R, 244/161, 170; 188/378, 379, 380
See application file for complete search history.

(56) References Cited

U.S. PATENT DOCUMENTS

| | | | | |
|---|---|---|---|---|
| 3,102,722 A | * | 9/1963 | Hamontre | 267/165 |
| 4,641,732 A | * | 2/1987 | Andry | 188/379 |
| 4,673,170 A | * | 6/1987 | Dykema | 267/174 |
| 5,052,529 A | * | 10/1991 | Sutcliffe et al. | 188/378 |
| 5,665,757 A | * | 9/1997 | Dunn et al. | 514/403 |
| 6,135,390 A | * | 10/2000 | Sciulli et al. | 244/158 R |
| 6,199,801 B1 | * | 3/2001 | Wilke et al. | 244/170 |
| 6,202,961 B1 | | 3/2001 | Wilke et al. | |

* cited by examiner

*Primary Examiner*—Tien Dinh
(74) *Attorney, Agent, or Firm*—Ingrassia Fisher & Lorenz, P.C.

(57) ABSTRACT

An apparatus is provided for attenuating shock and vibration energy levels within a spacecraft interface isolation system. The apparatus includes one or more spring plate assemblies fitted with mechanical stops and damping devices. The isolation system is typically incorporated into an interface unit, which is connected between the launch vehicle and the payload, in order to reduce the shock and vibration load energy imposed on the payload during the fairing separation processes. The mechanical stops maintain a desired level of stiffness for the payload supporting structure during lift-off and Max q, and the damping devices reduce the spring plate oscillation tendency during fairing separation. The combination of spring plate, stop, and damping device provides a significant reduction in shock and vibration energy levels in the approximate frequency range of 100 to 300 Hz.

23 Claims, 9 Drawing Sheets

Section B-B

Detail E

SHOCK AND VIBRATION ISOLATION SYSTEM

TECHNICAL FIELD

The present invention generally relates to shock and vibration isolation devices, and more particularly relates to shock and vibration isolation devices for spacecraft applications.

BACKGROUND

One application area of current spacecraft technology is the launching into orbit of various payloads, such as communication satellites and exploratory vehicles. For example, a Boeing Delta IV rocket may be used as a launch vehicle for a payload, such as a Eutelsat communications satellite. During the launching and separation processes (when the fairing is separated from the launch vehicle), the payload is typically subjected to significant amounts of shock and vibration stresses. The fairing is a structure that protects the payload from rain, lightning, winds, contamination and heating, until the launch vehicle reaches a very high altitude. The fairing separates from the launch vehicle when the heating rate on the payload is below a predetermined value. Under certain conditions, the transient shock and vibration energy experienced by the payload can exceed the design limits within the 100 to 300 Hz frequency range. The spacecraft is subject to high loads at lift-off, and again as the launch vehicle is subjected to atmospheric turbulence (e.g., at 35,000 to 40,000 feet) at the same time that the vehicle is subjected to its maximum dynamic external pressure (Max q). However, at the time of fairing separation, the loads on the spacecraft are very low.

Since the payload typically carries many sophisticated devices dedicated to the successful completion of a mission, it is important to limit the shock and vibration load energy imposed on the payload from the fairing separation processes. For this purpose, an interface shock and vibration isolation assembly is typically connected between the launch vehicle and the payload. This interface assembly generally incorporates some type of isolation assembly to reduce the shock and vibration impact on the payload. The isolation assembly may also be configured as the entire interface assembly between launch vehicle and payload.

As the demand increases for different types and sizes of payloads, the shock and vibration reduction requirements for isolation assemblies become ever more stringent. Therefore, a need exists to increase the shock and vibration absorption capabilities of spacecraft interface isolation assemblies. At the same time, it is desirable that the improved isolation assembly supports the payload at lift-off and Max q without significant change in the stiffness of the spacecraft supporting structure. In addition, it is generally desirable that an improved isolation assembly does not significantly increase the weight or size of the interface assembly. It is also generally desirable that an improved isolation assembly can be easily retrofitted into an existing spacecraft interface design.

Accordingly, it is desirable to provide a spacecraft interface isolation system with improved shock and vibration reduction capabilities, such that the improved isolation system does not significantly change the stiffness of the supporting structure. In addition, it is desirable for the improved isolation system to be a convenient mechanical retrofit for an existing system. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices are provided for reducing the shock and vibration energy load levels imposed on a spacecraft payload during the lift-off and separation processes. One exemplary device comprises an interface isolation assembly, which is typically connected between a launch vehicle and a payload. The interface isolation assembly generally includes a payload attach fitting and a shock and vibration isolation assembly connected to the payload attach fitting. The exemplary shock and vibration isolation assembly typically includes a spring mechanism with deflection stops and damping devices attached to the spring mechanism. The stops are generally configured to stiffen and stabilize the spring mechanism when the lift-off and Max q loads are applied to the spring mechanism, thereby limiting the change in stiffness of the payload supporting structure.

The spring mechanism typically includes a spring plate and one or more mechanical stop assemblies attached to the spring plate to limit the deflection of the spring plate under lift-off and Max q load conditions. The spring mechanism also typically includes damping devices attached to the spring plate to reduce the tendency of the spring plate to oscillate at its natural frequency.

During fairing separation, when the loads on the spring mechanism are relatively low, the spring plate is free to oscillate without contacting the stop assemblies. The natural oscillation frequency of the spring plate is generally set at approximately 40 Hz, and the damping devices are typically configured to provide a damping constant for the spring plate of approximately 20% at 40 Hz.

An exemplary damping device includes a piston and magnetized cylinder assembly filled with a magnetic damping medium, such as a Magnetorheological fluid. The action of the magnetic damping medium within the magnetized cylinder generally provides a stiff damping effect on the spring plate, which limits the magnification of oscillation at the natural frequency, and typically attenuates the shock and vibration load energy across a broad frequency range, including the 100 to 300 Hz range.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of shock and vibration isolation between a spacecraft launch vehicle and its payload. The shock and vibration isolation system is typically incorporated into an interface assembly, which is generally connected between the payload and the launch vehicle. During the launch processes at lift-off and Max q, the isolation system within the interface assembly is configured to reduce the change in stiffness of the payload supporting structure. During the payload separation processes, the isolation system within the interface assembly is configured to reduce the shock and vibration load energy imposed on the payload.

Figure 1:
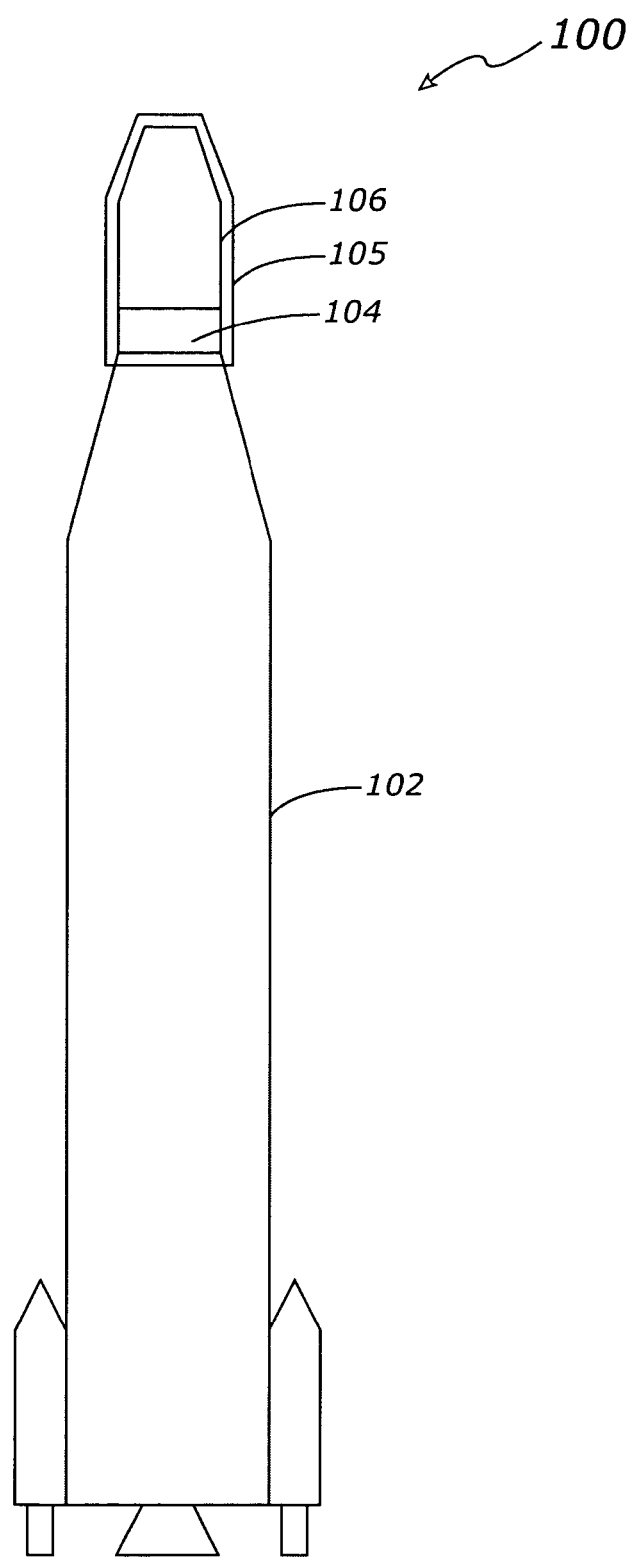
FIG. 1 is a simplified representation of an exemplary payload, interface and launch vehicle assembly.

A simplified depiction of a typical space vehicle 100 is shown in FIG. 1. A rocket-powered launch vehicle 102, such as a Boeing Delta IV, is connected to a payload 106, such as a Eutelsat W5 or other satellite, with an interface assembly 104, and protected by a fairing 105. As noted above, interface assembly 104 would typically contain a shock and vibration isolation system to reduce the shock and vibration stresses on payload 106 during fairing separation.

Figure 2:
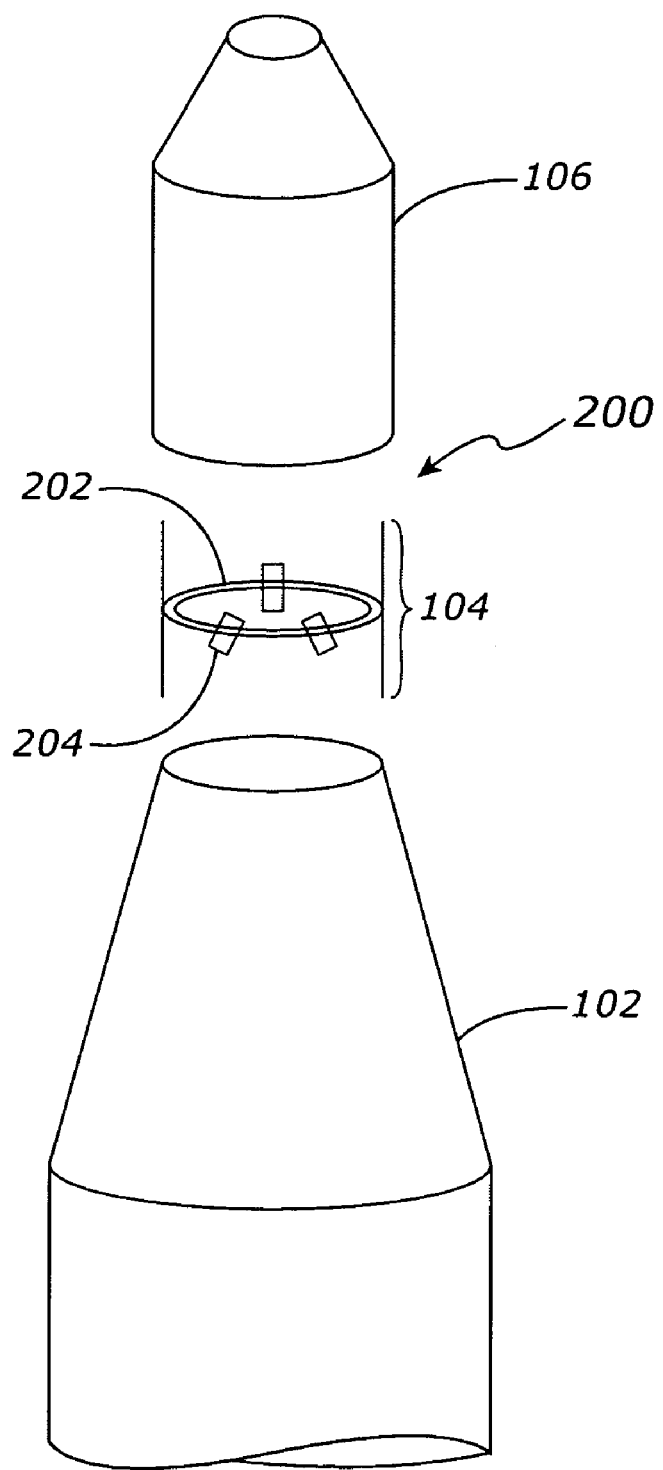
FIG. 2 is a simplified representation of an exemplary interface assembly between a payload and a launch vehicle.

One exemplary embodiment of a shock and vibration isolation system 200 is shown in FIG. 2, within the interface assembly 104. A simplified depiction of a payload attach fitting 202 represents the mechanical interface between launch vehicle 102 and payload 106, where payload 106 becomes detached from interface assembly 104 and launch vehicle 102 during separation. Shock-absorbing spring mechanisms 204 are combined with payload attach fitting 202 to provide shock and vibration isolation for payload 106 during the fairing separation processes. While three spring mechanisms 204 are illustrated in FIG. 2, any appropriate number of spring mechanisms 204, or equivalent devices, may be used in accordance with the requirements of a particular application.

Figure 3:
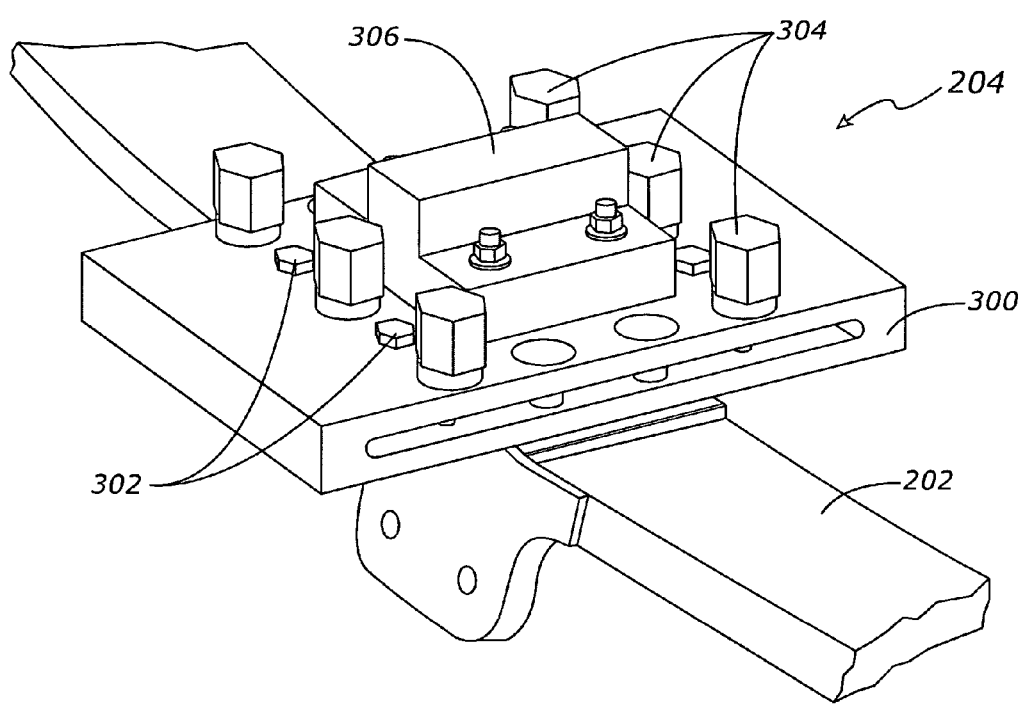
FIG. 3 is a perspective view of a simplified exemplary embodiment of a spring mechanism.

A more detailed view of an exemplary spring mechanism 204 is shown in FIG. 3. Typically, a spring plate 300 is mounted to a portion of payload attach fitting 202 by a mounting block arrangement 306, or by any other suitable technique, such as bolts, welding, etc. Mechanical stop assemblies 302 are installed in spring plate 300 to limit deflection under compression and tension load conditions, which occur at lift-off and Max q, and damping devices 304 are also installed in spring plate 300 to dampen and stabilize the shock and vibration absorption characteristics of spring plate 300. The type, quantity and arrangement of stop assemblies and damping devices illustrated in FIG. 3 are merely exemplary, and may vary in accordance with a particular application.

Figure 4:
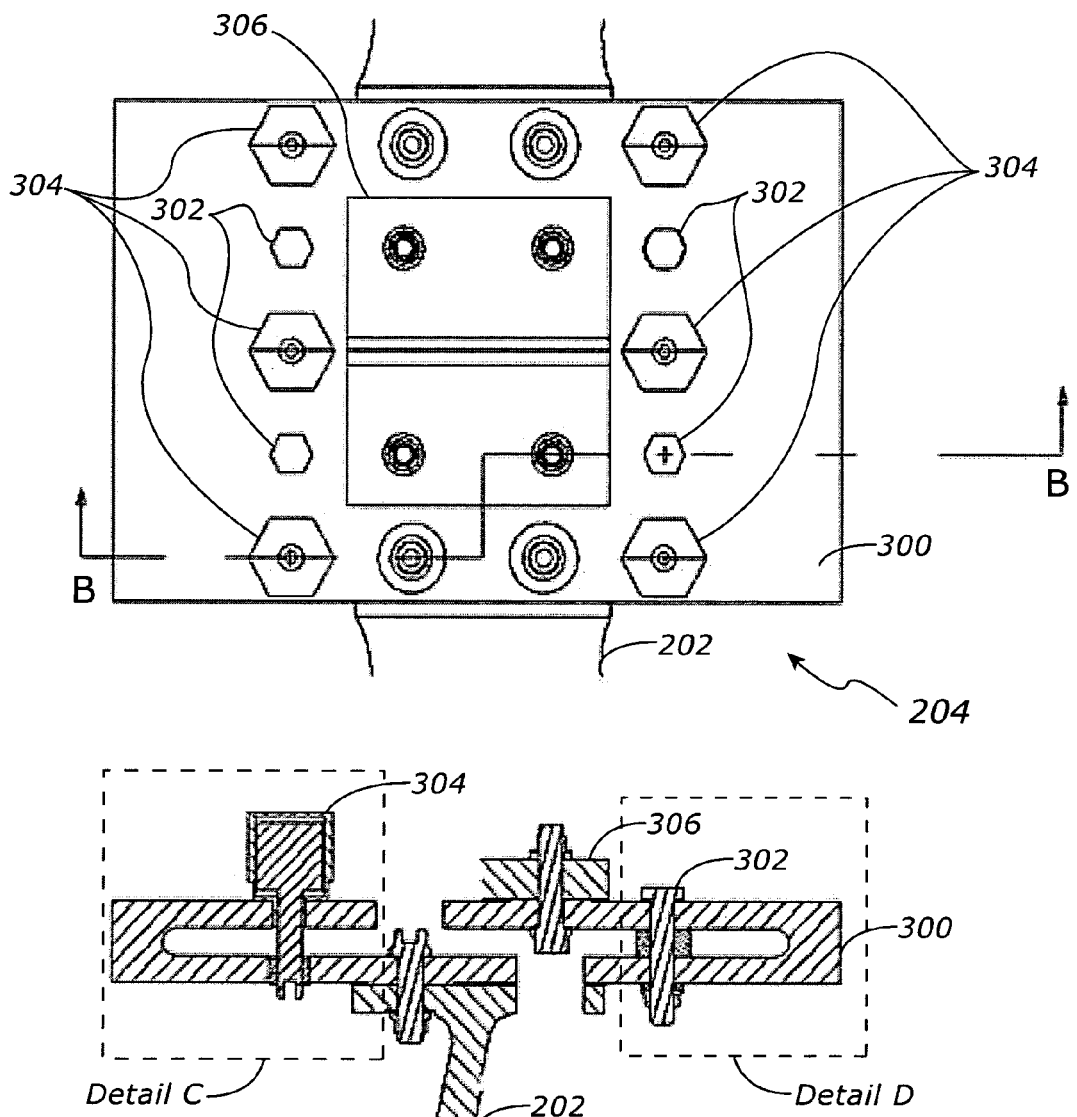
FIG. 4 is a plan and cross-section view of an exemplary embodiment of a spring mechanism.

A plan and cross-section view of the exemplary embodiment 204 is shown in FIG. 4. In this embodiment, four mechanical stop assemblies 302 are used in conjunction with six damping devices 304. The mounting configurations of mechanical stop assemblies 302 and damping devices 304 are shown in Detail D and Detail C, respectively. As previously noted, the particular configuration of spring mechanism 204 illustrated in FIGS. 3 and 4 is only one exemplary embodiment, which can also be implemented in numerous other configurations to accommodate the requirements of a particular application. The operation of mechanical stop assemblies 302 and damping devices 304, as installed in spring plate 300, will be described more fully below, in conjunction with FIGS. 5–7.

Figure 5:
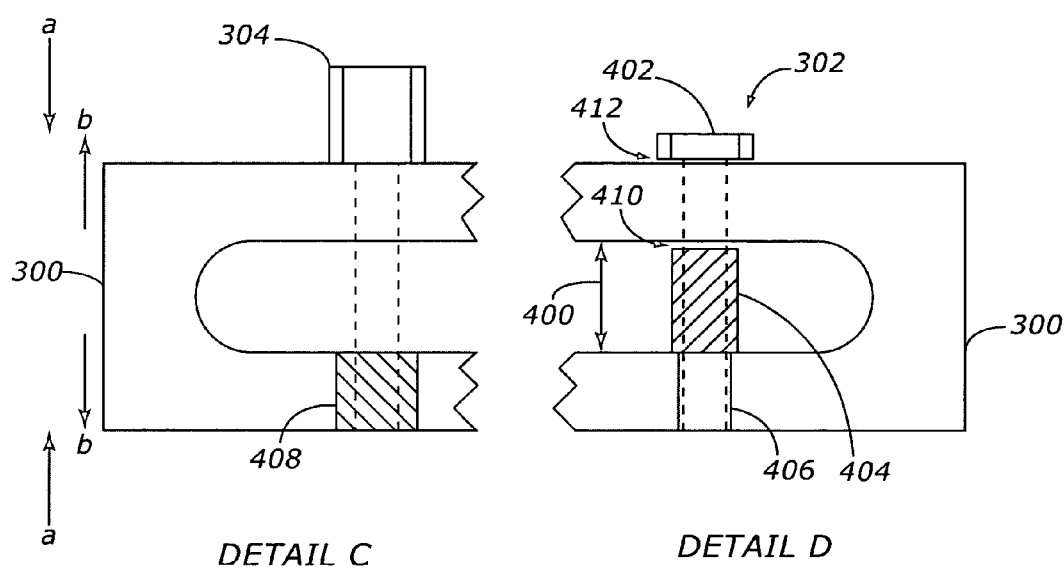
FIG. 5 is a simplified depiction of the exemplary details of FIG. 4.

For clarity, simplified depictions of mechanical stop assembly 302 Detail D and damping device 304 Detail C are shown in FIG. 5. As noted previously, the particular configuration of these components can vary in accordance with the application. Exemplary spring plate 300 is typically configured with an opening 400 to enable spring plate 300 to deflect and expand freely under compression and tension load conditions which occur during fairing separation. Exemplary stop assembly 302 is also configured with small gaps 410 and 412 between stop assembly 302 and spring plate 300, so that spring plate 300 does not contact stop assembly 302 when subjected to the relatively low compression and tension loads that occur during fairing separation. However, gaps 410 and 412 are made small enough so that spring plate 300 does contact stop assembly 302 during the relatively high compression and tension loads experienced during lift-off and Max q, in order to maintain the stiffness of the payload supporting structure. An exemplary spring plate 300 can be fabricated from any suitable high-strength, low-weight material, such as magnesium, aluminum, titanium or graphite/epoxy composite laminate.

Stop assembly 302 is typically configured to limit the deflection and expansion of spring plate 300 through the use of a bolt 402, a stop 404, and an insert 406. In this exemplary embodiment, bolt 402 is inserted into spring plate 300, through stop 404, and threaded into insert 406. Stop assembly 302 typically limits the deflection and expansion of spring plate 300 under compression and tension forces, as indicated by arrows a—a (compression) and b—b (tension) in FIG. 5, which occur during lift-off and Max q. For example, in one embodiment, the deflection of spring plate 300 is limited to about 0.01 inch or so, in order to provide a very stiff load path during the launch process. The compression limitation is provided by stop 404, and the tension limitation is provided by bolt 402. In an exemplary embodiment, gaps 410 and 412 are each calculated to be 0.01 inch, so that spring plate 300 is free to oscillate during fairing separation without contacting bolt 402 or stop 404. The representations of gaps 410 and 412 are exaggerated in FIG. 5 for clarity.

An exemplary damping device 304 is configured to provide damping of spring plate 300 during fairing separation, when spring plate 300 is free to oscillate. That is, exemplary damping device 304 is configured to limit the amplitude of oscillation at the natural frequency of spring plate 300. Exemplary damping device 304 is typically configured as a hydraulic piston-cylinder assembly for providing viscous damping to spring plate 300. Damping device 304 may be secured into spring plate 300 by any suitable technique, as indicated in this simplified depiction by threading into an insert 408 in spring plate 300. A more detailed description of the installation of damping device 304 into spring plate 300 will be given below in conjunction with FIGS. 6 and 7.

Figure 6:
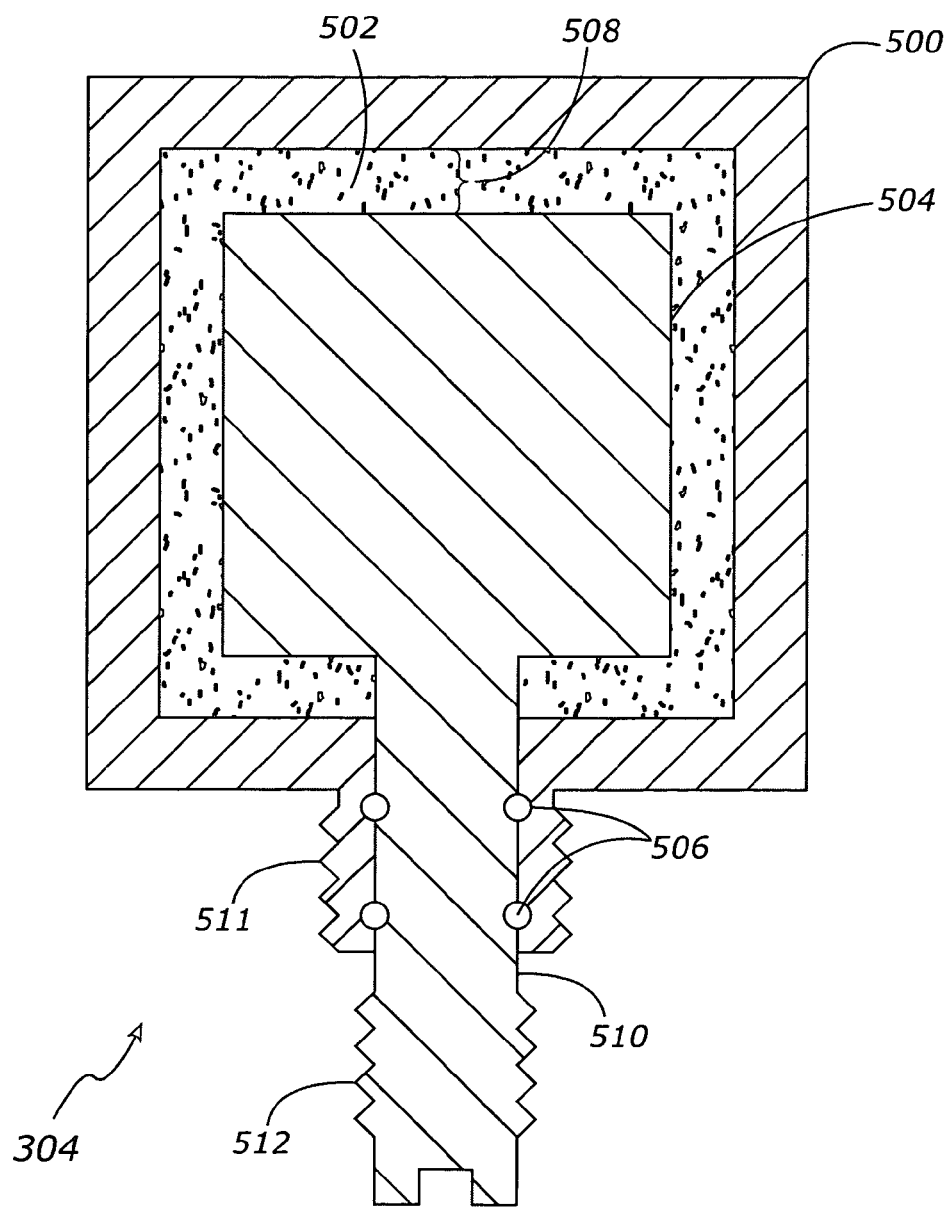
FIG. 6 is a diagram of an exemplary embodiment of a damping device for a spring plate.

An exemplary embodiment of a damping device 304 is illustrated in open view format in FIG. 6. As shown in FIG. 6, damping device 304 contains a piston 504 enclosed within a magnetized cylinder 500. The interior clearance space between piston 504 and magnetized cylinder 500 is generally filled with a magnetic type of damping medium 508, which may consist of a hydraulic fluid combined with magnetic particles 502, such as iron filings. A commercially available type of magnetic fluid is known as Magnetorheological fluid.

The interaction between magnetic damping medium 508 and magnetized cylinder 500 typically increases the effective viscosity of damping medium 508, which produces a stiff damping characteristic for damping device 304. That is, the effective drag force of damping device 304 is approximately proportional to the speed at which piston 504 moves through damping medium 508. The damping medium 508 is typically sealed within magnetized cylinder 500 with "O" rings 506, which are generally mounted on the shaft 510 of piston 504. In this exemplary embodiment, magnetized cylinder 500 includes threads 511 for secure insertion into the top portion of spring plate 300, while shaft 510 includes threads 512 for secure insertion into the lower portion of spring plate 300.

Figure 7:
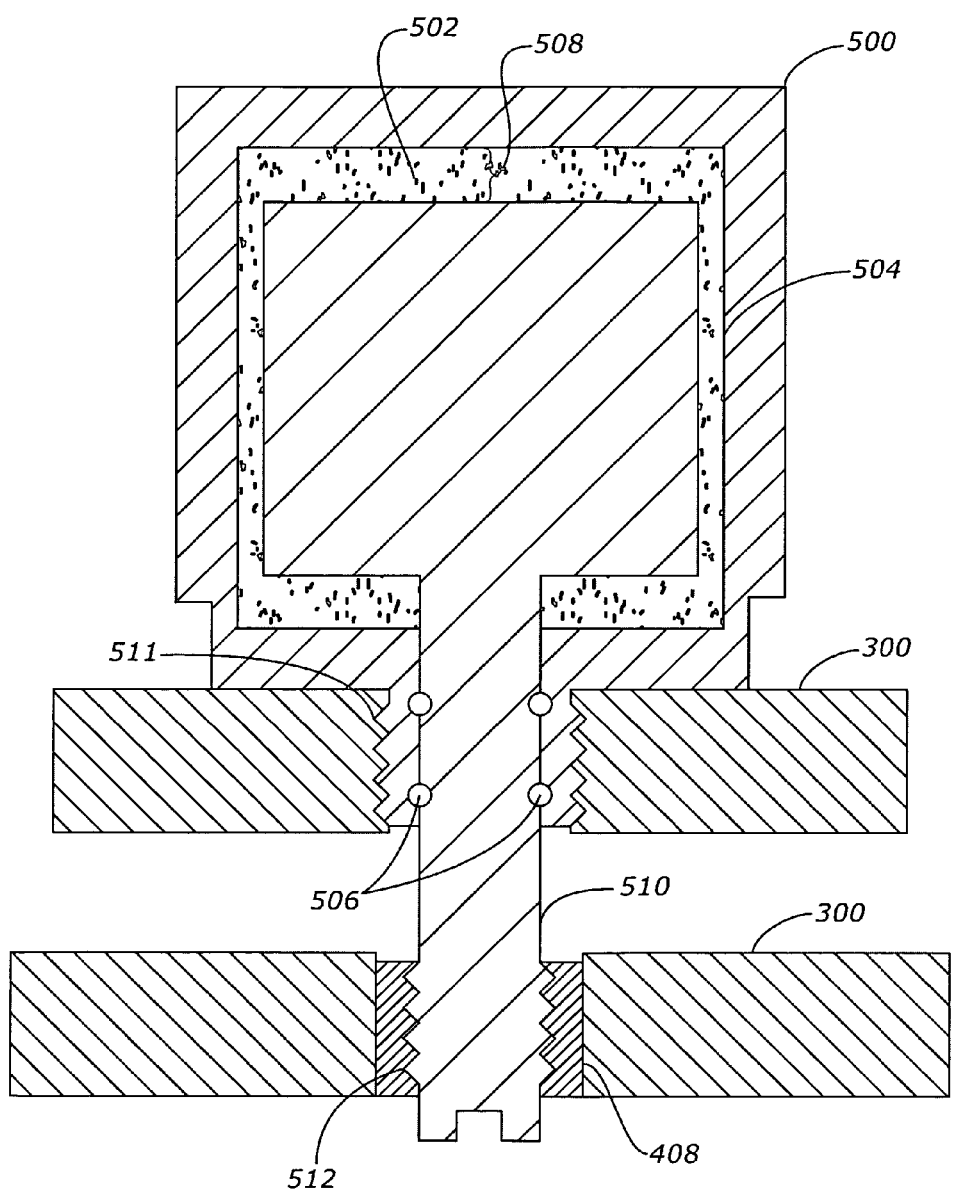
FIG. 7 is an illustration of an exemplary embodiment of a damping device installed in a spring plate.

Damping device 304 is configured to reduce the tendency of spring plate 300 to oscillate at its natural frequency. That is, if spring plate 300 were not damped, it would tend to oscillate at its natural frequency under conditions of shock and vibration. This oscillatory condition can significantly degrade the desired shock and vibration absorption characteristics of spring plate 300, with adverse effects on the payload. In order to dampen this oscillation tendency, damping device 304 is typically installed into spring plate 300 as shown in FIG. 7. In this exemplary embodiment, magnetized cylinder 500 is secured to the top portion of spring plate 300 by threads 511, while shaft 510 of piston 504 is secured into insert 408 in the lower portion of spring plate 300 by threads 512. When damping device 304 is installed in spring plate 300 under load conditions, the viscous drag dynamic of piston 504 moving through the magnetic medium 508 within magnetized cylinder 500 acts as an attenuating force to reduce or eliminate the amplitude of oscillations of spring plate 300.

In the embodiment described herein, a typical natural oscillation frequency of spring plate 300, based on its mechanical configuration, is approximately 40 Hz. This nominal 40 Hz frequency may be selected to provide sufficient separation from the natural frequency of approximately 68 Hz, which is typical for a payload attach fitting and spacecraft assembly. Also in this embodiment, damping device 304 is configured to provide a damping constant of approximately 20% for spring plate 300, in order to significantly reduce the transient shock and vibration forces above about 100 Hz, although greater or lesser damping constants could be used in alternate embodiments.

Figure 8:
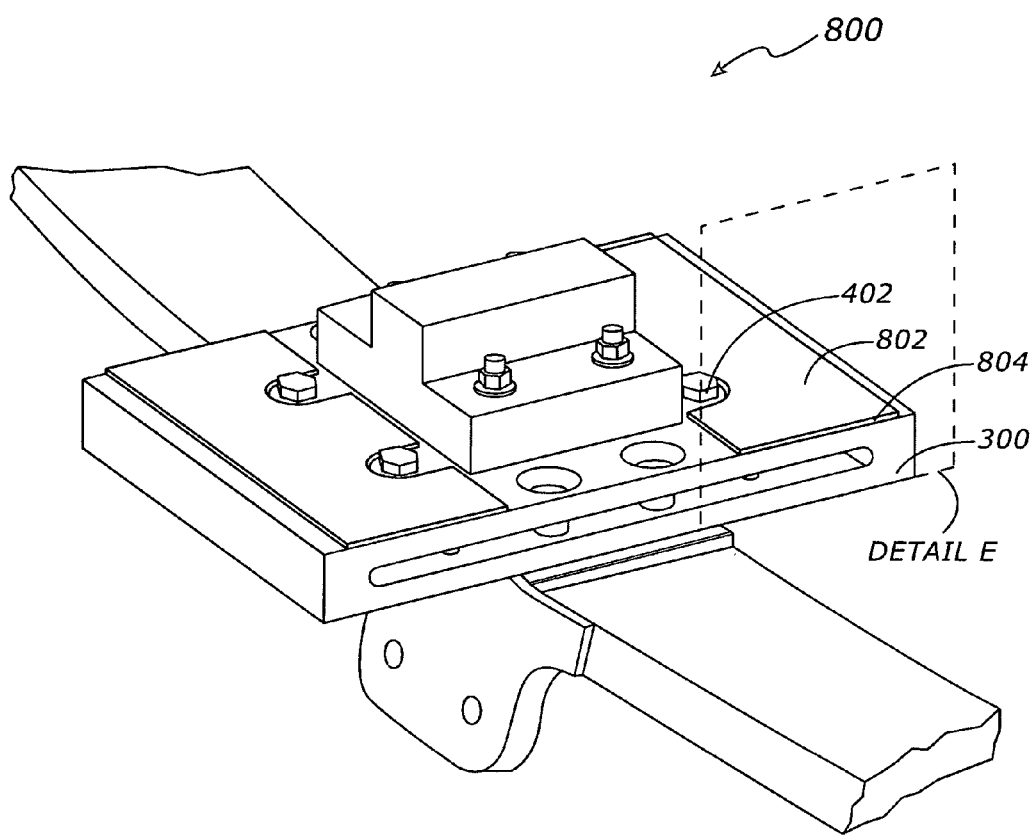
FIG. 8 is a perspective view of an alternate exemplary embodiment of a damping device attached to a spring plate.
Figure 9:
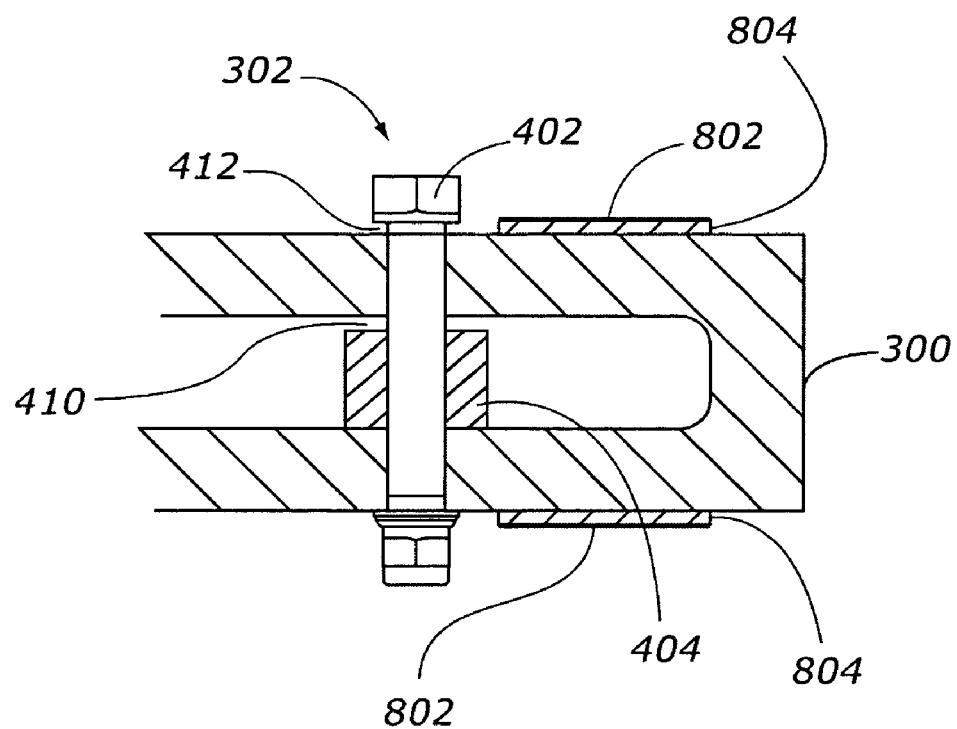
FIG. 9 is an illustration of the detail of FIG. 8.

In an alternate embodiment, the hydraulic piston/cylinder configuration of damping device 304 can be replaced with a different type of known damping arrangement, such as constrained layer damping, as shown in FIGS. 8 and 9. FIG. 8 is a perspective illustration of a spring mechanism 800, which includes a spring plate 300 and mechanical stop assemblies 402 in the same manner as described above. In this alternate embodiment, however, a thin layer of visco-elastic damping material 804 is applied to the outer longitudinal surfaces of spring plate 300, and a thin metal plate 802, e.g., aluminum, is attached to the outer surfaces of the visco-elastic material 804. The combination of damping material 804 and plate 802 provides a constraining layer on the top and lower portions of spring plate 300, which can offer a similar type of spring plate 300 damping as previously described for damping device 304. The area designated as Detail E is shown more clearly in FIG. 9.

The expanded illustration of Detail E in FIG. 9 shows mechanical stop assembly 302 in the same configuration as previously described. In addition, an exemplary embodiment of constrained layer damping is shown by the configuration of visco-elastic damping material 804 and thin metal plate 802 installed on the top and lower portions of spring plate 300.

In summary, an exemplary embodiment of a shock isolation system, designated as spring mechanism 204, incorporates a spring plate 300, with stop assemblies 302 and damping devices 304 coupled to spring plate 300 to improve its shock and vibration absorption characteristics in the low frequency range, including the 100 to 300 Hz range. Stop assemblies 302 limit the compression and tension deflections of spring plate 300 during lift-off and Max q, and do not significantly change the stiffness of the spacecraft supporting structure. Damping devices 304 control and stabilize the natural oscillation tendencies of spring plate 300. Alternate damping embodiments, such as the constrained layer damping combination 802, 804, can also be used to reduce the oscillation tendencies of spring plate 300. Various embodiments of a shock isolation system, as disclosed herein, may be configured for very high-stress conditions, as are generally experienced by spacecraft and other airborne vehicles. Typically, an embodiment of a shock isolation system would be incorporated into a spacecraft interface assembly that couples a launch vehicle to its payload, in order to protect the payload from the shock and vibration forces that occur during fairing separation.

Accordingly, the shortcomings of the prior art have been overcome by providing an improved shock and vibration isolation system for a spacecraft interface assembly. Spring mechanisms incorporating spring plates, stop assemblies and damping devices are configured to provide a greater degree of shock and vibration load energy absorption during the fairing separation processes of a typical payload and launch vehicle, while also maintaining the stiffness of the spacecraft during lift-off and Max q. The exemplary embodiment of a spring mechanism disclosed herein can be configured for convenient retrofit into an existing interface assembly, with minimal impact on the size and weight of the system. The type, quantity and arrangement of the stop assemblies and damping devices may be adjusted to suit the particular shock and vibration isolation application.

Whereas the exemplary embodiment disclosed herein generally pertains to spacecraft interface assemblies, other embodiments of the present invention may be useful in a broad range of shock isolation systems, including non-spacecraft applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An interface assembly for attaching a spacecraft payload to a launch vehicle, comprising:

a payload attach fitting configured to couple the payload to the launch vehicle;

a shock and vibration isolation assembly coupled to the payload attach fitting, the shock and vibration isolation assembly comprising:

a spring plate;

a stop assembly incorporated into the spring plate; and a damping device mounted to the spring plate, wherein at least a portion of the damping device is disposed above the spring plate, wherein the stop assembly is configured to limit the deflection of the spring plate, and the damping device is configured to dampen the natural oscillation frequency of the spring plate.

2. The interface assembly of claim 1 wherein the spring plate has an internal opening to allow for compression and expansion of the spring plate under load conditions.

3. The interface assembly of claim 1 wherein the spring plate is fabricated from a high-strength, lightweight material.

4. The interface assembly of claim 1 wherein the spring plate is fabricated from aluminum.

5. The interface assembly of claim 1 wherein the spring plate is fabricated from magnesium.

6. The interface assembly of claim 1 wherein the spring plate is fabricated from graphite/epoxy composite laminate.

7. The interface assembly of claim 1 wherein the spring plate is fabricated from titanium.

8. The interface assembly of claim 1 wherein the stop assembly is configured to limit both the compression and tension of the spring plate to approximately 0.01 inch.

9. The interface assembly of claim 1 wherein the natural oscillation frequency of the spring plate is approximately 40 Hz.

10. The interface assembly of claim 9 wherein the damping device causes the spring plate to have a damping constant of approximately 20%.

11. The interface assembly of claim 1 wherein the damping device comprises a piston housed within a magnetized cylinder assembly filled with a magnetic damping medium.

12. The interface assembly of claim 11 wherein the magnetic damping medium is a Magnetorheological fluid.

13. The interface assembly of claim 11 wherein the drag force of the piston attenuates shock and vibration energy in an approximate frequency range of 100 to 300 Hz.

14. The interface assembly of claim 1 wherein the damping device comprises a piston housed within a cylinder assembly.

15. The interface assembly of claim 14 wherein the drag force of the piston attenuates shock and vibration energy in an approximate frequency range of 100 to 300 Hz.

16. The interface assembly of claim 14 wherein the cylinder assembly comprises a magnetized cylinder assembly.

17. The interface assembly of claim 16 wherein the magnetized cylinder assembly is filled with a magnetic damping medium.

18. The interface assembly of claim 17 wherein the magnetic damping medium is a Magnetorheological fluid.

19. The interface assembly of claim 1 wherein the piston extends through the spring plate.

20. The interface assembly of claim 1 wherein the stop assembly comprises a stop disposed within the spring plate, wherein the stop is configured to limit deflection of the spring plate.

21. The interface assembly of claim 20 wherein the stop assembly further comprises a bolt inserted through the stop, wherein the bolt is configured to limit expansion of the spring plate.

22. The interface assembly of claim 1 wherein the stop assembly extends substantially perpendicular to and through the spring plate.

23. The interface assembly of claim 1 wherein the stop assembly extends substantially parallel to the damping device.

* * * * *